Aug. 17, 1971    J. H. CYPHER ET AL    3,600,151
APPARATUS FOR TEMPERING GLASS SHEETS
Filed Aug. 5, 1969

INVENTORS
JAMES H. CYPHER
GEORGE W. STILLEY

Chisholm and Spencer
ATTORNEYS

United States Patent Office 3,600,151
Patented Aug. 17, 1971

3,600,151
APPARATUS FOR TEMPERING GLASS SHEETS
James H. Cypher, New Kensington, and George W. Stilley, Freeport, Pa., assignors to PPG Industries, Inc., Pittsburgh, Pa.
Continuation-in-part of application Ser. No. 806,803, Mar. 13, 1969, which is a continuation-in-part of application Ser. No. 572,043, Aug. 12, 1966. This application Aug. 5, 1969, Ser. No. 847,617
Int. Cl. C03b 27/00
U.S. Cl. 65—348                                          7 Claims

ABSTRACT OF THE DISCLOSURE

Tempering a heated glass sheet by imparting a pattern of moving blasts of tempering medium, such as air, against the major surfaces of the hot glass sheet from a pair of sets of spaced parallel pipes each having substantially equi-distant apertures. All of the apertures are arranged in rows extending at an oblique angle to the axis of linear reciprocation of relative movement between the glass and the apertures and in rows approximately normal to said axis. The pipes are reciprocated in unison along an axis of reciprocation to provide an amplitude of reciprocation so related to the aperture spacing and said orientation of the oblique lines of apertures that each aperture occupying a first position at one end of its reciprocation path is displaced to a second position between corresponding first positions occupied by other apertures from the oblique lines of apertures and from the transverse rows of apertures. This arrangement provides a substantially equal application of tempering medium to each increment of glass sheet surface.

RELATION TO OTHER APPLICATIONS

The present application is a continuation-in-part of U.S. patent application Ser. No. 806,803 of James H. Cypher and George W. Stilley, filed Mar. 13, 1969 now abandoned. Said latter application, in turn, is a continuation-in-part of U.S. patent application Ser. No. 572,043 of James H. Cypher, filed Aug. 12, 1966 now Pat. No. 3,510,286.

SUMMARY OF THE INVENTION

This invention relates to treating glass sheets, and particularly relates to the shaping and tempering of thin glass sheets. For the purposes of the present invention thin glass is defined as glass having a nominal thickness of $3/16$ inch and less.

Tempered glass is characterized by a skin that is stressed in compression completely surrounding an interior core that is stressed in tension. In order to produce tempered glass, a glass sheet is first heated to a temperature well above its strain point, and approaching its softening point. Such a temperature is preferably substantially uniform through the glass thickness in any given area although it may vary from area to area when differential tempering is desired. The elevated temperature required for tempering is higher than the temperature needed to deform the glass sheet.

After the glass sheet has obtained a sufficiently high temperature, it is suddenly chilled by quenching. This latter step is usually accomplished by applying cold air jets rapidly against the opposite surfaces of the heat softened sheet while providing relative movement between the sheet and the jets. The secret of an effective tempering operation is to chill the glass so rapidly that its surface regions are cooled through the annealing range of the glass to its strain point where the surface becomes set while the interior remains above the strain point and is still plastic.

It is well known that the portions of the glass sheet that cool through the annealing range before other portions develop a compression stress whereas the other portions develop a tension stress when the entire glass sheet cools and remains permanently below the strain point. Since glass is notoriously strong when stressed in compression and weak when stressed in tension, the glass skin stressed in compression provides a protective coating that causes the glass to be much stronger than untempered glass in its resistance to fracture. Another factor in rendering tempered glass safer than untempered glass is that tempered glass breaks up into very small fragments having smooth surfaces in the less frequent instances when it does fracture. These smoother particles of fractured tempered glass or "dice" are far less harmful to occupants of a vehicle than fractured untempered glass, which fractures more readily than tempered glass and, upon fracturing, produces pieces having jagged edges that are very dangerous.

In the past, requirements for automotive tempered glass has required glass of a nominal thickness of $1/4$ inch. Glass of such thickness was relatively easy to temper by the air quenching technique described above because the interior of the glass was sufficiently massive to retain a source of heat that retarded the cooling rate of the interior of the glass while the exterior was chilled to below the strain point. However, when the automotive designers started to require thinner glass for tempered glass window closures for the automobiles, it became more difficult to maintain a temperature gradient between the surfaces and the interior of the glass sheet undergoing tempering because there was less distance along which to establish an effective temperature difference between the surface and the interior and because the relative thinness of the glass left a much smaller interior mass in which to store the interior heat.

One method developed for bending and tempering thin glass sheets is the so-called gas hearth method. A typical gas hearth operation is disclosed and claimed in U.S. Pat. No. 3,223,501 to James C. Fredley and George E. Sleighter. This method, developed by PPG Industries, Inc., formerly called the Pittsburgh Plate Glass Company, floats a succession of glass sheets on a relatively hot fluid bed until the glass is at a temperature sufficiently hot for tempering. At this point, the glass is suddenly quenched by chilling while still being supported with its major surfaces in contact only with fluid. The gas hearth method, by its very efficient heat exchange, enables very thin glass on the order of $1/8$ inch thickness to be either tempered or bent and tempered.

The aforesaid invention, while a tremendous step forward in the glass fabrication art, rendered a lot of existing equipment obsolescent if not obsolete. The present invention makes it possible to continue to use existing equipment that was developed for bending and tempering relatively thick glass sheets without requiring major modifications of the type necessitated by conversion to the gas hearth type of operation. The present invention provides more rapid and uniform quenching of heated glass sheets for tempering the latter. In a typical operation where the present invention is especially useful, a series of glass sheets is conveyed through a heating, shaping and quenching operation. In cases where the glass is to be tempered without shaping, the present invention is equally useful to improve the quenching operation even where the shaping is omitted. The present invention is also suitable for quenching hot glass that has been thermally processed to provide a coating thereon.

In a typical shaping and tempering operation, each glass sheet of a series of glass sheets is heated to its deformation temperature while transported through a furnace, and when it reaches a temperature sufficient for tempering, is removed from the furnace and sandwiched between a pair of glass shaping members that engage the thin, heat-softened glass sheet to press the glass to its desired configuration. The shaping members are held in pressurized engagement for sufficient time to insure that the glass sheet retains the shape imparted thereto. The shaping members are then retracted. The shaped glass sheet is then quenched by applying blasts of chilling fluid against the opposite surfaces of the still heated press bent glass sheets.

A typical apparatus for performing the present invention will now be described in order to facilitate understanding of the present invention. In brief, such apparatus for tempering glass sheets comprises a pair of sets of spaced, parallel pipes, each having apertures arranged in equidistant relation along the length of each pipe and in approximately the same equidistant relation from pipe to pipe to form an array of spaced apertures comprising an oblique line of apertures for each set of pipes and a series of transverse rows of apertures formed by the oblique lines of apertures, means for supporting a hot glass sheet in a position intermediate said pair of sets of parallel pipes with said apertures of one set of pipes facing one major glass sheet surface and said apertures of the other of said pair of sets of pipes facing the other major glass sheet surface when said glass sheet occupies said position, means for reciprocating said pipes in unison along an axis of reciprocation, means for providing tempering medium under pressure to said pipes for discharge through said apertures against the opposite major glass sheet surfaces and thence to escape through the spaces between said pipes, said apertures being arranged in oblique lines of apertures oriented at an oblique angle to said axis of reciprocation and in transverse rows of apertures transverse to said axis of reciprocation, and means for providing an amplitude of reciprocation for said pipes so related to the aperture spacing and said orientation of said oblique lines of apertures that each aperture occupying a first position at one end of its reciprocation path is displaced to a second position at the other end of its reciprocation path intermediate corresponding first positions occupied by other apertures of said other oblique lines of apertures and of said other transverse rows of apertures, whereby the amount of tempering medium imparted to each increment of glass sheet surface is approximately equal to that imparted to each other increment of glass sheet surface.

The axis of reciprocation may be vertical or horizontal or oblique, depending on the axis of curvature of the glass sheet being tempered, if the glass is curved, but must be at an oblique angle to the axis formed by an oblique line of spaced apertures.

In the drawings which form part of the invention and wherein like reference numbers refer to like structural elements, FIG. 1 is a longitudinal elevation of a part of a heating furnace, a shaping station and a quenching apparatus for performing the present invention;

Figure 6:
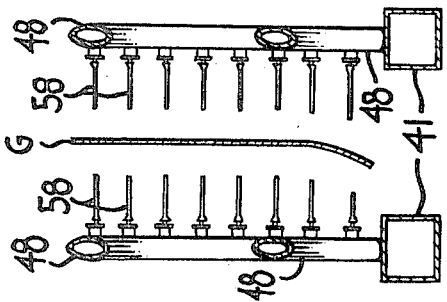
Figure 2:
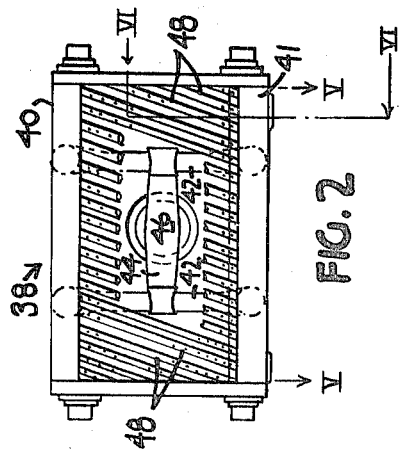
FIG. 2 is a fragmentary front elevation showing how pipes of a quenching apparatus are arranged to face a glass sheet in the quenching apparatus of FIG. 1.
Figure 5:
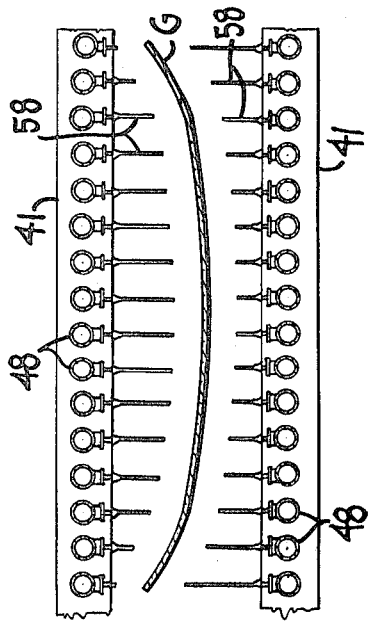
Figure 4:
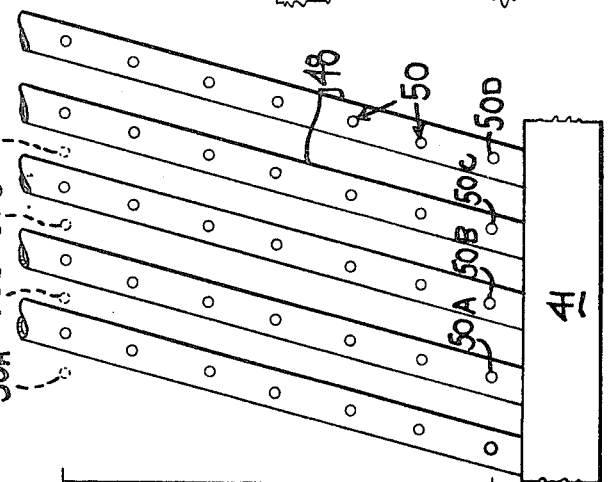

FIG. 4 is an enlarged fragmentary view of a portion of the quenching apparatus of FIG. 2, showing in detail how the pipes and their apertures are arranged with reference to the direction and amplitude of their displacement during a quenching operation during which hot glass is tempered; and FIGS. 5 and 6 are fragmentary sectional views showing how nozzle extensions are arranged when the present apparatus is used to temper glass sheets curved about a vertical axis of bending and about a horizontal axis of bending, respectively.

Figure 1:
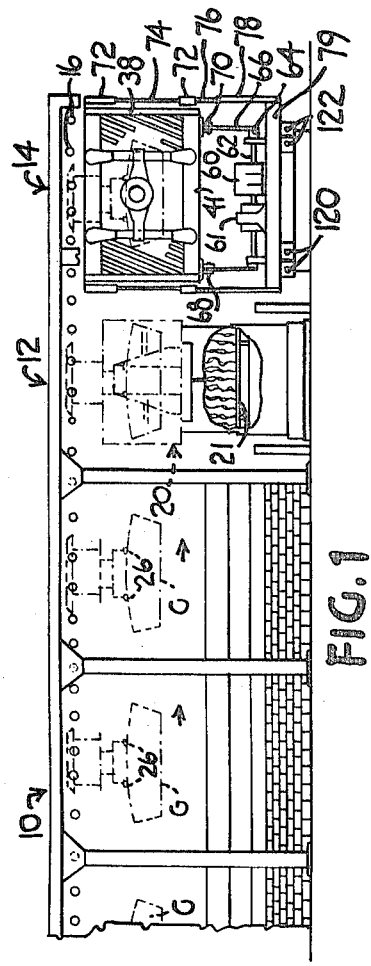

Referring to the drawings, FIG. 1 shows an illustrative apparatus for bending and tempering thin glass sheets using the principles of the present invention. The apparatus comprises a tunnel-like furnace 10 disposed in end to end relation with a glass shaping station 12 and a glass quenching station 14. An overhead conveyor 16 comprising a plurality of conveyor rolls mounted in longitudinally spaced relation along a suitable support extends through the furnace 10, the glass shaping station 12 and the glass quenching station 14.

The tunnel-like furnace used for heating glass sheets to their deformation temperature is provided with usual electrical heating elements along its opposite side walls. The heating elements irradiate the glass sheets as the latter traverse the furnace 10. The intensity of the radiant heaters is correlated with the speed of the glass sheets moving through the furnace to have each glass sheet reach a desired temperature as it leaves the furnace 10.

The shaping station 12 is located beyond the furnace and in longitudinal alignment therewith and comprises a pair of glass shaping members 20. Only one of the shaping members is shown from the rear view in FIG. 1. The shaping members 20 are of the conventional type having substantially continuous complementary shaping surfaces opposing one another. An elongated, apertured gas pipe 21 extends lengthwise of the shaping station. The glass shaping members are preferably of the type described and claimed in U.S. Pat. No. 3,367,764 to Samuel L. Seymour, assigned to PPG Industries, Inc.

The glass shaping members 20 move between a closed position in which they engage the opposite surfaces of a heat-softened glass sheet in pressurized engagement to shape the latter, and a retracted position. In the latter position, the shaping members 20 permit glass sheets to move into and out of the glass shaping station 12.

The glass quenching station 14 comprises a pair of opposed plenum chambers 38, one of which is shown in FIG. 2. Each plenum chamber comprises a series of upper and lower horizontally extending pipes 40 and 41, respectively, which are fed from branching feed pipes 42. The latter extend vertically in both directions from a common horizontal pipe 44. The latter extends horizontally outward in two directions from a main supply duct 46. The latter, in turn, is connected through a flexible connector (not shown) to a source of air under pressure such as a blower (also not shown).

A timer control circuit and a valve serves to control the rate of flow and whether there is any air flow into the supply duct 46. Such apparatus for controlling the rate of fluid flow and the duration of fluid flow at different rates is available in the open market and forms no part of the present invention even though it is included in the illustrative embodiment.

A plurality of air pipes 48 extends obliquely from the upper and lower horizontal pipes 40 and 41 and are provided with individual nozzles 50 arranged to form an oblique line of spaced nozzles for each pipe disposed to cause tempering medium such as air to flow outward from the oblique pipes 48 under pressure toward the opposite major glass sheet surfaces. The air pipes are spaced equally from one another and are parallel to one another.

The apertures of adjacent nozzles are aligned to form horizontal rows of spaced nozzles.

Figure 3:
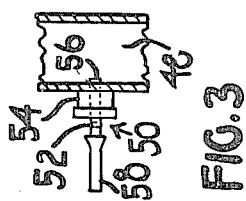
FIG. 3 is an enlarged view of an individual nozzle showing how the latter is connected to one of the air supply pipes of the apparatus of the preceding figure.

Each nozzle 50 is shown in FIG. 3 to comprise a main nozzle portion 52 externally threaded to be received within a hexagonal nut 54 welded to the outer wall of a pipe in surrounding relation to an aperture 56 therein. A flexible extension member 58, which may be composed of a closely wound spring, a tube of silicone rubber, or the like, has its inner end securely fastened over the outer surface of the nozzle portion 52. The length of the extensions 58 vary depending upon their point of attachment to the nozzle portions 52. The length of each nozzle extension 58 is chosen to provide uniform distance between the nozzle orifice and the major glass surface portion the nozzle faces regardless of the shape of the glass being quenched. For example, FIG. 5 shows an arrangement of nozzle extensions for a typical automobile backlight shape where a glass sheet supported in a vertical plane with its length extending horizontally is bent about its vertical axis to form two end portions bent sharply relative to a substantially flat central portion and FIG. 6 shows an arrangement of nozzle extensions for a rear quarter light of a station wagon supported in a vertical plane with its length extending vertically and with its lower end portion bent about a horizontal axis relative to its main portion.

It is well known that it is necessary to have a continuous relative movement between the glass and the nozzles through which air is applied under pressure during the quenching operation and to have each glass sheet increment subjected to the same amount of cooling as each other glass increment in order to minimize iridescent markings on the glass. The present invention achieves both of these objectives.

A motor 60 (FIG. 1) operating through a speed reducer 61 actuates a drive shaft 62 containing eccentric drives 64 at the ends thereof to produce said continuous relative movemeit. Each eccentric drive 64 is pivoted to the lower end of a connecting link 66. The upper end of the connecting link 66 is pivotally secured to a bracket 68 through a pivot pin 70. The bracket 68 is rigidly secured to the lower surface of the lower horizontal pipe 41 of one of the plenum chambers 38.

A plurality of sleeves 72 are secured to each side of the plenum chamber 38 and ride on vertical shafts 74. Compression springs 76 are carried along each shaft between the lower sleeves 72 and supports 78 mounted on a platform 79 that also supports the motor 60 and its driven apparatus.

When the motor 60 operates, it rotates drive shaft 62 through speed reducer 61 to cause the plenum chambers 38 to reciprocate vertically in unison in paths defined by shafts 74 while air is imparted through the nozzles 50 extending from the oblique pipes 48. The oblique pipes 48 are arranged at an angle to the vertical and are equally spaced from one another and have their nozzles equally separated from one another along each pipe a distance such that a given reciprocation of the plenum chambers in a vertical direction causes each nozzle to move from a position at one extremity of its reciprocation to a position at the other extremity of its reciprocation that is intermediate, and preferably midway, the positions occupied by adjacent nozzles at said one extremity of said reciprocation. In this manner, the area of glass swept by each air blast overlaps that swept by adjacent blasts and each glass sheet increment is subjected to a mass of air approximately equal to that of each other increment. Having nozzles of 1/16 inch inner diameter separated one inch apart along the length of each pipe of 1/2 inch outer diameter and 1/8 inch wall thickness and having the openings one inch apart in a direction normal to the axis of pipe reciprocation with a 6 inch displacement of reciprocation and a five inch space between opposing sets of nozzles provides a good overall coverage for quenching the glass and also sufficient space between adjacent pipes to permit the air blasts to escape after impinging on the glass surfaces.

The oblique rows of nozzles 50 are preferably oriented at an angle of about 15 degrees to the axis of reciprocation. Any given nozzle is aligned with nozzles of adjacent pipes spaced four horizontal rows apart along the axis of reciprocation. By providing a displacement equal to the distance separating horizontal rows that are six horizontal nozzle rows apart, the given nozzle occupies a position at the other end of its displacement that is intermediate the positions occupied by adjacent nozzles at the positions they occupy at the first end of their displacement. This is illustrated in FIG. 4 where nozzles 50A, 50B, 50C and 50D occupy the solid line positions at one end of their displacement and occupy positions 50A', 50B', 50C' and 50D', shown in dotted lines, at the other end of their reciprocation. While the illustrated apparatus shows vertical reciprocation, which is most suitable for tempering bent glass sheets oriented as shown in FIG. 5, it is also contemplated within the present invention to reciprocate the nozzles in unison along any axis oblique to a row of nozzles. For example, reciprocation along a horizontal axis is optimum for tempering a glass sheet oriented as in FIG. 6.

Initially, a flat glass sheet G is mounted for bending by engaging its upper edge with a pair of tongs 26. The glass sheet progresses through the tunnel-like furnace 10. By the time the glass sheet reaches the glass shaping station 12, it has reached its deformation temperature. The glass shaping members 20 move into pressurized engagement with the opposite surfaces of the glass sheet. Notches are provided in the shaping members 20 for tong clearance in alignment with the tongs. The shaping members 20 are retracted and the shaped glass sheet, gripped by the tongs 26, arrives between the plenum chambers 38. There, tempering medium such as air under pressure is applied against the opposite surfaces of the bent glass sheet and the plenum chambers reciprocated vertically in such a manner as to insure that the entire glass sheet is quenched by air under pressure.

In a typical operation given by way of example to show a working embodiment of the present invention, glass sheets having a nominal thickness of 1/8 inch were heated by passing them serially through a furnace supported by tongs and on an outline shaping surface of the type described hereinabove to reach a surface temperature of 1220 degrees Fahrenheit. Two minutes in the furnace sufficed for this heating. The glass sheet, on obtaining a surface temperature of 1220 degrees Fahrenheit was transferred to the shaping station 12 in 4¾ seconds. When the glass reached the shaping station 12, it took 2 seconds for the shaping members to engage the glass in pressurized engagement. The shaping members were held in pressurized engagement against the glass for 4 seconds. The glass remained at the shaping station an additional 4 seconds while the shaping members were separated from one another. Then, the bent glass sheet was transferred to the quenching station 14.

The elongated burner below the shaping members was a ¾ inch diameter apertured pipe having upward facing apertures fabricated using a No. 28 drill having a diameter of 0.1405 inch. The apertures were equally spaced 5/8 inch apart center to center. Natural gas was supplied at a pressure of 9 ounces per square inch to the gas pipe and burned at the apertures as it escaped from the pipe and mixed with air at the shaping station to form flames extending upward a sufficient distance to engulf the glass sheet.

The quenching station 14 comprised a series of parallel pipes 48, each apertured at one inch intervals to receive a nozzle. The pipes were 1/2 inch outer diameter having 1/8 inch wall thickness with 1/2 inch horizontal spacing between adjacent pipes.

The nozzle extensions 58 were of such lengths that they opposed one another at 5 inch spacing with the glass centrally disposed between them. The plenum chambers 38 were reciprocated at 30 cycles per minute through a 6 inch stroke with nozzles of 1/16 inch inner diameter separated one inch apart along each pipe length applying a pressure of 16 pounds per square inch on the concave glass surface and 18 pounds per square inch on the convex glass surface when 3/16 inch thick glass sheets of commercial plate glass were being quenched.

When 1/8 inch nominal thickness plates of commercial sheet glass were being quenched, the same kind of sequence was followed except that a pressure of 22 pounds per square inch was applied on the concave glass surface and 24 pounds per square inch against the convex glass surface during the quenching. All pressures were measured in the header so that the pressures at the nozzles were somewhat less than the measured pressures reported.

In order to facilitate the resetting of nozzle extensions 58 to conform to a different shape of glass sheet whenever a production change is required, each plenum chamber 38 is readily retracted from its operative position. To accomplish this object, each platform 79 on which each plenum chamber 38 is mounted is provided with downward extending ears 120 supported in sliding relation on guides 122. The latter extend transverse to the length of the conveyor 16 and are spaced on opposite sides from the vertical plane containing the conveyor 16.

The present invention has made it possible to continue to use furnaces and quenching equipment that have been in existence previously for tempering thicker glass sheets. It was unnecessary to convert the production of all of these parts having a nominal thickness of 1/8 inch to a gas hearth type of equipment. Considerable investment was saved and cost of converting the equipment reduced to that needed to apply a higher pressure for quenching than has been the case previously.

The form of the invention shown and described in this disclosure represents an illustrative descriptive embodiment thereof. It is understood that various changes may be made without departing from the spirit of the invention as defined in the claimed subject matter which follows. For example, the amplitude of reciprocation for the opposed plenum chambers may be a displacement other than the specific distance recited above when the nozzle spacing and/or the angle of obliquity of the oblique line of nozzles is different from the illustrative embodiment.

A formula to determine the approximate optimum displacement for a given angle of obliquity for the oblique lines of nozzles relative to the axis of reciprocation and nozzle to nozzle spacing:

$$D = y \left(\frac{n+1}{2}\right) \csc\, a$$

where:

D is the displacement, or amplitude of reciprocation, y is the center to center distance between adjacent apertures, n is an even positive integer, and csc. $a$ is the cosecant of the angle of obliquity (preferably approximately an even integer).

It is preferred to use a minimum displacement to minimize the strain on the motive equipment that displaces the tempering nozzles. Therefore, in the above formula, it is preferred to use a displacement based on $n$ equal to 2.

Since the nozzles have finite diameter and the blasts from the nozzles expand en route from nozzle to glass, it is not necessary that the formula be followed exactly. Some slight variation is permitted in obliquity of the angle between the oblique lines of nozzles and the axis of reciprocation, for example. In addition, the amplitude need not be exact, but may vary by about half the diameter of the air blast at the glass surface from the exact distance calculated in the formula and still yield results superior to those obtained where the displacement approximates an integral number of nozzle to nozzle distances. A few examples will suffice to indicate permitted variations, When the angle between the axis of reciprocation to the oblique line of nozzles is about 15 degrees (varying from 13 to 16 degrees) (the cosecant of 14.5 degrees being 4) and the nozzles in each oblique line and in each row transverse to said oblique lines are approximately equally distant, the displacement should approximate 6 or 10 or 14 times the nozzle to nozzle spacing preferably 6. When said oblique angle is from 29 to 31 degrees or about 30 degrees (the cosecant of said angle being 2), the displacement should approximate 3 or 5 or 7 times the nozzle to nozzle spacing, preferably 3. When said oblique angle is about 9 to 10 degrees (the cosecant of 9.6 degrees is 6), the displacement should approximate 9 or 15 or 21 times the nozzle to nozzle distance, preferably 9. It is easy to understand from the above analysis why the formula $D = y\ (4m+2)$, where $m$ is any integer, applies for an obliquity angle of about 15 degrees. It is also obvious in the light of the foregoing why a 15 degree obliquity angle, a nozzle to nozzle spacing of one inch and a displacement of six inches was chosen for the illustrative embodiment. An obliquity angle other than one having a cosecant approximating an even integer will also provide a nozzle position for each nozzle at one end of the displacement pattern that is intermediate positions occupied by other nozzles at the other end of the displacement pattern for all the nozzles.

We claim:

1. Apparatus for tempering glass sheets comprising a pair of sets of spaced, parallel pipes, each having apertures arranged in equidistant relation along the length of each pipe and in equidistant relation from pipe to pipe to form an array of spaced apertures for each set of pipes, means for supporting a hot glass sheet in a position intermediate said pair of sets of parallel pipes with said apertures of one set of pipes facing one major glass sheet surface and said apertures of the other of said pair of sets of pipes facing the other major glass sheet surface when said glass sheet occupies said position, means for providing tempering medium under pressure to said pipes for discharge through said apertures against the opposite major glass sheet surfaces and thence to escape through the spaces between said pipes, said apertures being arranged in oblique lines of apertures oriented at an oblique angle to an axis of reciprocation and transverse rows of apertures transverse to said axis of reciprocation, and means for reciprocating said pipes in unison along said axis of reciprocation to provide an amplitude of reciprocation or displacement D for said pipes so related to the aperture spacing and said orientation of said oblique lines of apertures that each aperture occupying a first position at one end of its reciprocation path is displaced to a second position between corresponding first positions occupied by other apertures from said oblique lines of apertures and from said transverse rows of apertures whereby the amount of tempering medium imparted to each increment of glass sheet surface is approximately equal to that imparted to each other increment of glass sheet surface.

2. Apparatus as in claim 1, wherein said second position is approximately midway of said corresponding first positions of said other apertures.

3. Apparatus as in claim 1, wherein said pipes are oriented at an angle of approximately 15 degrees to said axis of reciprocation and said apertures of adjacent pipes are aligned in said transverse rows extending approximately normal to said axis of reciprocation, and said amplitude of reciprocation equals $(4m+2)y$, where $y$ is the center to center distance between adjacent apertures and $m$ is an integer.

4. Apparatus as in claim 3, wherein said glass sheet supporting means supports a glass sheet in a vertical position, said pipe reciprocating means reciprocates said pipes along a vertical axis and said transverse rows of apertures are aligned horizontally.

5. Apparatus as in claim 1, further including a nozzle for each aperture, each nozzle extending toward said position occupied by a glass sheet.

6. Apparatus as in claim 5, wherein each of said nozzles extends for a predetermined distance to terminate in a curved surface parallel to a major surface of a curved glass sheet to be tempered.

7. Apparatus as in claim 1, wherein said displacement D approximates $$y\left(\frac{n+1}{2}\right) \csc. a$$

where $y$ is the center to center distance between adjacent apertures, $n$ is an even integer and csc. $a$ is the cosecant of the angle between said oblique lines of apertures and said axis of reciprocation.

References Cited

UNITED STATES PATENTS

| | | | |
|---|---|---|---|
| 3,510,286 | 5/1970 | Cypher | 65—104 |
| 3,256,080 | 6/1966 | Vranken | 65—104 |
| 3,454,389 | 7/1969 | O'Connell et al. | 65—351 |

FOREIGN PATENTS

| | | |
|---|---|---|
| 1,158,738 | 1/1958 | France. |

S. LEON BASHORE, Primary Examiner

S. R. FRIEDMAN, Assistant Examiner

U.S. Cl. X.R.

65—104, 114, 268